US007660010B2

(12) United States Patent
Furihata et al.

(10) Patent No.: US 7,660,010 B2
(45) Date of Patent: Feb. 9, 2010

(54) CONTROLLER DRIVER, LIQUID CRYSTAL DISPLAY APPARATUS USING THE SAME, AND LIQUID CRYSTAL DRIVING METHOD

(75) Inventors: Hirobumi Furihata, Kanagawa (JP); Takashi Nose, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 945 days.

(21) Appl. No.: 11/304,727

(22) Filed: Dec. 16, 2005

(65) Prior Publication Data

US 2006/0152501 A1 Jul. 13, 2006

(30) Foreign Application Priority Data

Jan. 13, 2005 (JP) ............................ 2005-006288

(51) Int. Cl.
*G06F 15/00* (2006.01)
*H04N 9/79* (2006.01)

(52) U.S. Cl. ....................................... 358/1.17; 386/45

(58) Field of Classification Search ................ 358/1.17, 358/426.02, 400, 402, 462; 382/251, 232, 382/239, 233, 248, 236; 709/231, 247, 218, 709/235, 230, 201; 386/45, 109, 125; 348/473, 348/584, E5.102; 345/7, 32, 204; 341/51, 341/80, 120

See application file for complete search history.

(56) References Cited

U.S. PATENT DOCUMENTS

2003/0086127 A1* 5/2003 Ito et al. ..................... 358/462

FOREIGN PATENT DOCUMENTS

| | | |
|---|---|---|
| JP | 4-365094 | 12/1992 |
| JP | 2616652 | 3/1997 |
| JP | 2003-162272 | 6/2003 |
| JP | 2003-202845 | 7/2003 |

* cited by examiner

*Primary Examiner*—Saeid Ebrahimi Dehkordy
(74) *Attorney, Agent, or Firm*—McGinn IP Law Group, PLLC

(57) ABSTRACT

A controller driver includes a first compressor for compressing received image data to generate first compressed image data, a second compressor to generate second compressed image data, and an image memory capable of storing the second compressed image data of at least one frame. It also includes an overdrive processing unit for generating corrected image data where a tone value of the received image data is corrected from the first compressed image data or its expanded data and second compressed image data of one frame previous to the first compressed image data or its expanded data. The compression processing performed in the first compressor is the same as compression processing performed in the second compressor in compressing image data of one frame previous to the received image data.

13 Claims, 13 Drawing Sheets

Fig. 6A
| | | SUBSEQUENT FRAME TONE | | | |
|---|---|---|---|---|---|
| | | . . . | 20~23 | 24~28 | . . . |
| PRESENT FRAME TONE | . . . | . . . | . . . | . . . | . . . |
| | 16~19 | . . . | 24 | 32 | . . . |
| | 20~23 | . . . | PRESENT FRAME TONE VALUE | 30 | . . . |
| | . . . | . . . | . . . | . . . | . . . |
Fig. 6B
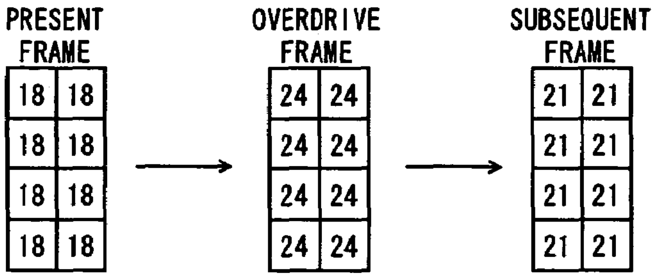
Fig. 6C
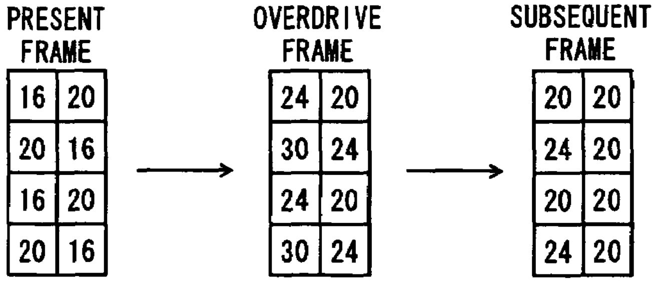

Fig. 9A FIRST STATE : MEMORY READ
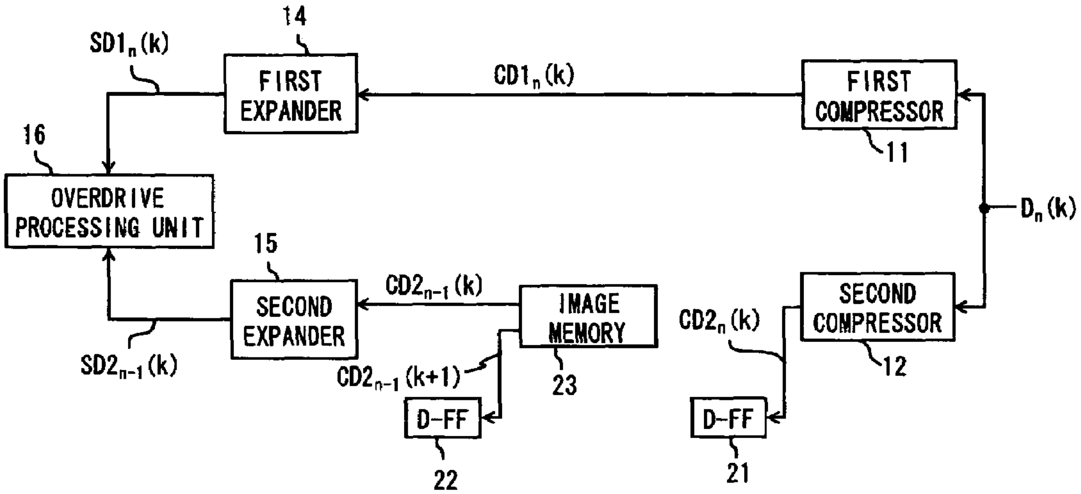
Fig. 9B SECOND STATE : MEMORY WRITE
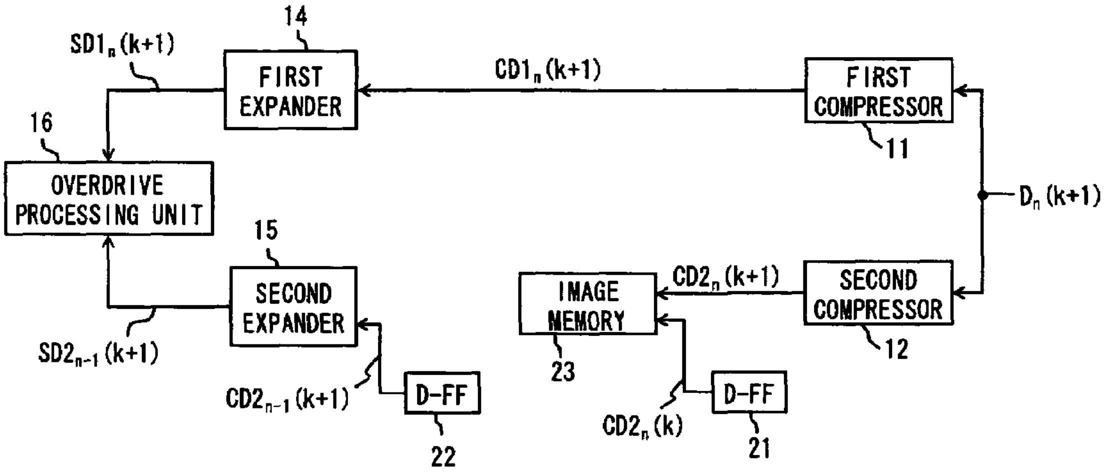

CONTROLLER DRIVER, LIQUID CRYSTAL DISPLAY APPARATUS USING THE SAME, AND LIQUID CRYSTAL DRIVING METHOD

BACKGROUND OF THE INVENTION

1. Field of the Invention

The present invention relates to a controller driver for driving a liquid crystal panel, a display apparatus, and a driving method of a liquid crystal panel.

2. Description of Related Art

Portable information equipment such as mobile phones and PDA includes a controller driver for driving a liquid crystal panel. Some controller drivers have an image memory capable of storing image data of one frame and a simple controller for generating a synchronization signal to indicate a display timing of the image data stored in the image memory. In this configuration, if there is no need to switch display images such as when displaying a still image, it is possible to display a still image by displaying the image data stored in the image memory on a liquid crystal panel without receiving image data from an external processor such as CPU. Such a configuration is effective for reducing power consumption.

FIG. 14 shows an example of a conventional liquid crystal display apparatus that has a controller driver with a built in memory. The conventional liquid crystal display apparatus includes a liquid crystal panel 7, a gate line driver 6 for driving a gate line of the liquid crystal panel 7, and a controller driver 8 for receiving image data $D_n$ from a processor 5 such as CPU and displaying it on the liquid crystal panel 7 of a mobile phone terminal or the like. The controller driver 8 includes an image memory 83 capable of storing image data of at least one frame, a tone voltage generator 17 for generating a tone voltage, a data line driver 89 for driving a data line of the liquid crystal panel 7, a timing controller 18 for indicating the data line driver 89 and the gate line driver 6 of a display timing, and a command controller 80 for indicating the tone voltage generator 17 of a setting of a tone voltage and indicating the timing controller 17 of an image display timing and so on. The configuration of the controller driver 8 shown in FIG. 1 is merely an example, and a controller driver may include a gate line driver or may further include a power supply circuit.

As described above, since the controller driver 8 has the image memory 83 capable of storing image data of at least one frame, it is possible to display a still image that is stored in the image memory 83 on the liquid crystal panel 7 without a need to transfer image data from the external processor 5. Specifically, the command controller 80 indicates the image memory 83 to transfer image data to the data line driver 89 and further indicates the data line driver 89 and the gate line driver 6 of a timing to display the image. This configuration allows stopping the operation of the external processor 5 during still image display and thereby reducing power consumption.

As mobile phone terminals become highly functional, they are required to have a function to display moving images. However, a liquid crystal panel has a slow speed of response to a change in display images, which causes an image out of focus when displaying moving images. To overcome this drawback, overdrive processing is performed in a large-sized liquid crystal panel or the like in order to improve a response speed of liquid crystal. The overdrive processing compares present image data with one frame previous image data. If a tone increases and thus luminance is higher, it drives a liquid crystal panel with a higher liquid crystal driving voltage than a normal level. If, on the other hand, a tone decreases and thus luminance is lower, it drives a liquid crystal panel with a lower driving voltage than a normal level. This processing increases a response speed of a liquid crystal panel. The overdrive processing is detailed in Japanese Patent No. 2616652, Japanese Unexamined Patent Publication No. 4-365094 and 2003-202845, for example.

Adding an overdrive processor to the controller driver 8 with the image memory 83 enables to improve a response speed of liquid crystal. However, there is a restriction in size for portable information equipment such as a mobile phone terminal, and thus a chip size of the controller driver 8 is preferably small. Merely adding the overdrive processor to the controller driver 8 results in an increase in the chip size of the controller driver 8.

As a means to reduce the chip size, it is effective to store image data after compressing it so as to reduce the size of an image memory that occupies a large proportion of a chip area. However, performing the overdrive processing with use of compressed image data stored in the image memory or its expanded image data fails to control a voltage applied to a liquid crystal panel accurately.

For example, in the case of compressing image data by a systematic dither method that is conventionally known, errors that are spatially distributed by the dither processing are enhanced by the overdriving processing, which causes an image displayed on a liquid crystal panel to be more granular. Specifically, if image data is compressed by 2 bits with use of a 2×2 dither matrix, even if input image data have the same tone, computing with the dither matrix results in an image with a four tone difference. It is assumed herein that the overdrive processing is performed when an entire display image changes from the same color to different colors. In this case, excessive overdrive of four tones occurs in some place. In the dither process, the excessive overdrive is applied to a particular place. This leads to more granular image display.

SUMMARY OF THE INVENTION

According to an aspect of the present invention, there is provided a controller driver which includes a compressing unit compressing received image data and generating first compressed image data and second compressed image data, an image memory capable of storing the second compressed image data of at least one frame, and an overdrive processing unit receiving the first compressed image data or its expanded data and also receiving the second compressed image data of one frame previous to the first compressed image data or its expanded data and generating corrected image data where a tone value of the received image data is corrected based on the data, wherein the compressing unit changes compression processing performed in generating the first compressed image data and the second compressed image data with time, and compression processing performed in generating the first compressed image data in the compressor is the same as compression processing performed in generating the second compressed image data by compressing image data of one frame previous to the received image data.

According to another aspect of the present invention, there is provided a liquid crystal display apparatus that includes the controller driver according to the above aspect of the invention and a liquid crystal display section driven by the controller driver.

This configuration allows changing compression errors that are contained in two image data to be compared by the overdrive processing unit as time passes so that the two image data are compressed and expanded with the same compression error. It is thereby possible to reduce granularity and block noise due to overdrive and compression error while reducing a circuit size of a controller driver, thus achieving appropriate overdrive processing without application of unnecessary voltage due to a difference in compression error to a liquid crystal panel.

According to still another aspect of the present invention, there is provided a liquid crystal driving method which includes receiving image data, compressing the received image data and generating first compressed image data, generating corrected image data where a tone value of the received image data is corrected based on the first compressed image data or its expanded data and the second compressed image data of one frame previous to the first compressed image data or its expanded data, wherein compression processing performed in generating the first compressed image data and the second compressed image data is changed with time, and compression processing performed in generating the first compressed image data in the compressor is the same as compression processing performed in generating the second compressed image data by compressing image data of one frame previous to the received image data.

This method allows changing compression errors that are contained in two image data to be compared at the time of overdrive processing as time passes so that the two image data are compressed and expanded with the same compression error. It is thereby possible to reduce granularity and block noise due to overdrive and compression error while reducing a circuit size of a controller driver, thus achieving appropriate overdrive processing without application of unnecessary voltage due to a difference in compression error to a liquid crystal panel.

The present invention can provide a controller driver that achieves both reduction in granularity and block noise due to overdrive and compression error to enable accurate control of a voltage to be applied to a liquid crystal panel and reduction in a circuit size of a controller driver, a liquid crystal display apparatus using the controller driver, and a liquid crystal driving method.

BRIEF DESCRIPTION OF THE DRAWINGS

The above and other objects, advantages and features of the present invention will be more apparent from the following description taken in conjunction with the accompanying drawings, in which:

FIGS. 6A to 6C are views to describe an object of the present invention:

FIGS. 9A and 9B are views showing the flow of image data in a controller driver according to an embodiment of the present invention;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
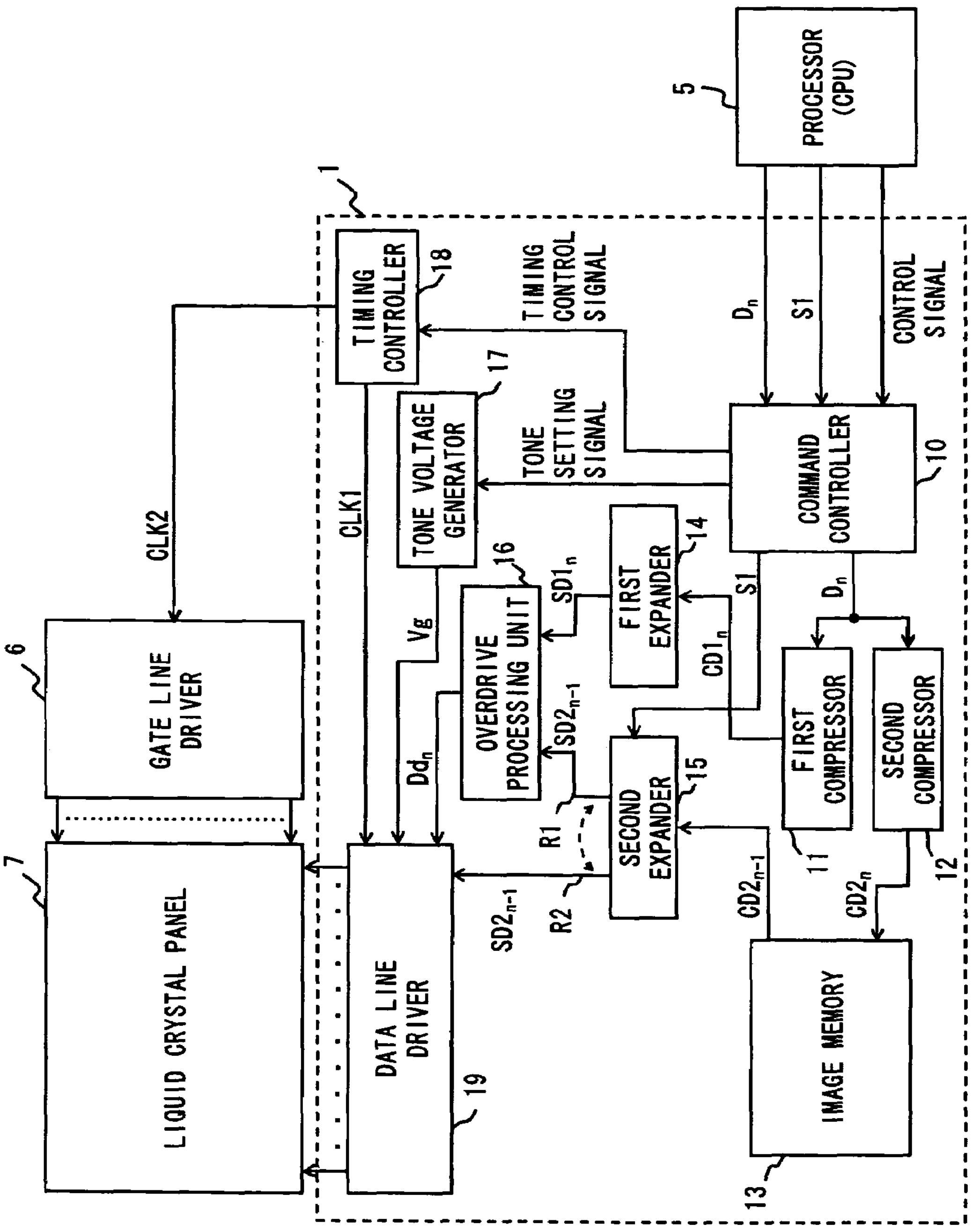
FIG. 1 is a block diagram of a controller driver according to an embodiment of the present invention.
Figure 14:
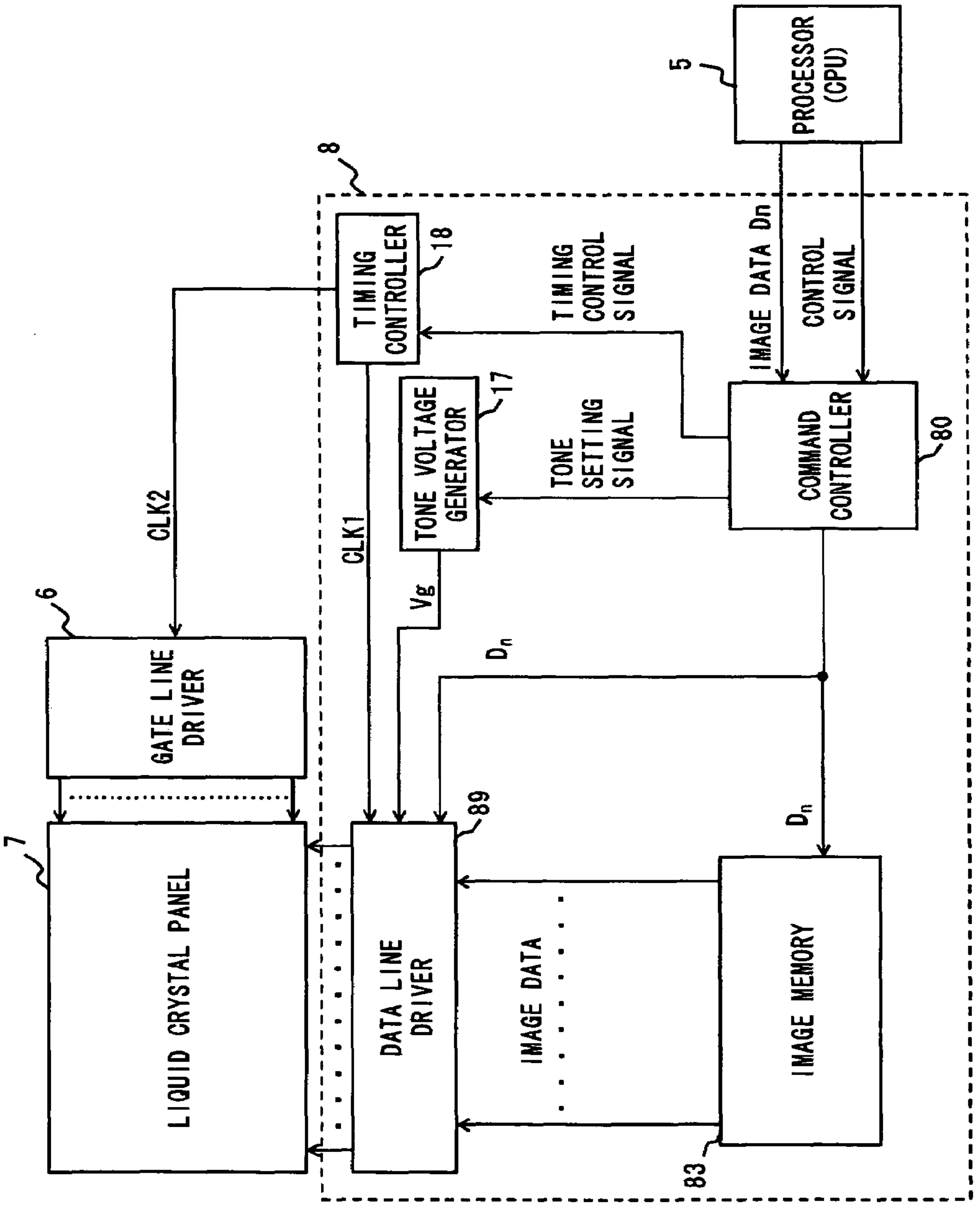
RELATED ART Fig. 14
FIG. 14 is a block diagram of a controller driver according to a conventional technique.

FIG. 1 shows the configuration of a liquid crystal display apparatus that has a controller driver 1 according to a first embodiment of the invention. The controller driver 1 has two compressors: a first compressor 11 and a second compressor 12, which perform compression independently of each other so as to change a compression error that is contained in compressed image data to be transferred to a first compressor 11 and a compression error that is contained in compressed image data to be stored in an image memory 13. Further, in the controller driver 1, a command controller 10 receives a moving/still image switching signal S1 from an external processor 5 and a second expander 15 switches an output destination of expanded image data according to the received signal S1. The controller driver 1 is described in detail below. The elements having the same function as those in FIG. 14 are denoted by the same reference numerals and not detailed herein.

The command controller 10 receives image data $D_n$, a control signal and a moving/still image switching signal S1 from the processor 5. The control signal contains a timing control signal for controlling a display timing when the image data $D_n$ is a moving image. The processor 5 controls the controller driver 1 with the control signal. The command controller 10 supplies the received image data $D_n$, to the first compressor 11 and the second compressor 12. Further, the command controller 10 supplies the moving/still image switching signal S1 to the second expander 15.

The first compressor 11 compresses the received image data $D_n$ in units of one pixel and supplies compressed image data $CD1_n$ to the first expander 14. The second compressor 12, on the other hand, compresses the image data $D_n$ and stores compressed image data $CD2_n$ into the image memory 13. The image memory 13 is capable of storing compressed image data of at least one frame. The first compressor 11 and the second compressor 12 can perform separate compression processing on the image data $D_n$. The compression processing that is performed in the first compressor 11 and the second compressor 12 is detailed later.

The first expander 14 expands the compressed image data $CD1_n$ and transfers expanded image data $SD1_n$ to the overdrive processing unit 16. The second expander 15 reads image data $CD2_{n-1}$ that is one frame previous to the compressed image data $CD1_n$ and compressed by the second compressor 12 from the image memory 13 and performs expansion processing thereon.

The second expander 15 selects between supplying the expanded image data $SD2_{n-1}$ to the overdrive processing unit 16 or supplying it directly to the data line driver 19 by bypassing the overdrive processing unit 16 according to the moving/still image switching signal S1. This operation may be implemented by various specific configurations. A specific configuration is not particularly limited as long as it can change the connection destination of the second expander 15 according to the moving/still image switching signal S1. For example, a output terminal of the second expander 15 may have a selector that operates according to the moving/still image switching signal S1 so as to select a route R1 to be connected to the overdrive processing unit 16 when displaying a moving image and select a route R2 to be connected to the data line driver 19 by bypassing the overdrive processing unit 16 when displaying a still image.

Figure 2:
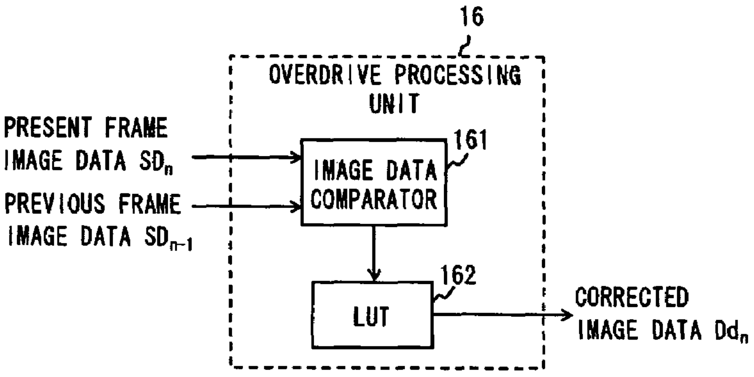
FIG. 2 is a block diagram of an overdrive processing unit.

The configuration example of the overdrive processing unit 16 is described herein with reference to FIG. 2. In the overdrive processing unit 16, an image data comparator 161 compares present frame image data $SD_n$ supplied from the first expander 14 and previous frame image data $SD_{n-1}$ supplied from the second expander 15 to detect a tone change between the both image data. Further, the image data comparator 161 refers to a look-up table (LUT) 162 to select corrected image data according to a tone change between the input image data $SD_n$ and $SD_{n-1}$ and supplies it as corrected image data $Dd_n$ to the data line driver 19.

The LUT 162 is a table that stores predetermined corrected image data $Dd_n$ in association with a combination of the present frame image data $SD_n$ and the previous frame image data $SD_{n-1}$. The corrected image data is determined so as to enhance the tone change between the input image data $SD_n$ and $SD_{n-1}$. If the data line driver 19 drives the liquid crystal panel 7 according to the corrected image data, a response speed of the liquid crystal panel 7 increases.

If the comparison between the present frame image data $SD_n$ and the previous frame image data $SD_{n-1}$ shows that they are the same, the image data comparator 161 outputs either the present frame image data $SD_n$ or the previous frame image data $SD_{n-1}$ as it is as corrected image data $Dd_n$. This is because there is no need to perform overdrive processing in this case.

Figure 3A:
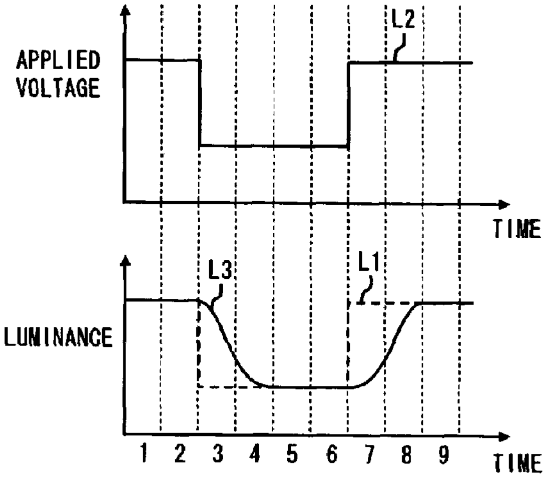
FIGS. 3A and 3B are views to describe the operation of the overdrive processing unit.

The effect of the overdrive processing is described with reference to FIGS. 3A and 3B. FIG. 3A shows the state of a voltage applied to the liquid crystal panel 7 and luminance of the liquid crystal panel 7 that changes in accordance with the applied voltage in the case where the overdrive processing is not performed. The horizontal axis of the graph indicates time in units of image frames. If image data to be displayed on the liquid crystal panel 7 changes as indicated by a dotted line L1, the applied voltage to the liquid crystal panel 7 changes as indicated by a solid line L2 in accordance with a change in luminance of the image data. Since a response speed of liquid crystal is slow, a change in display luminance of the liquid crystal panel delays from a change in the image data and the applied voltage as indicated by a solid line L3.

Figure 3B:
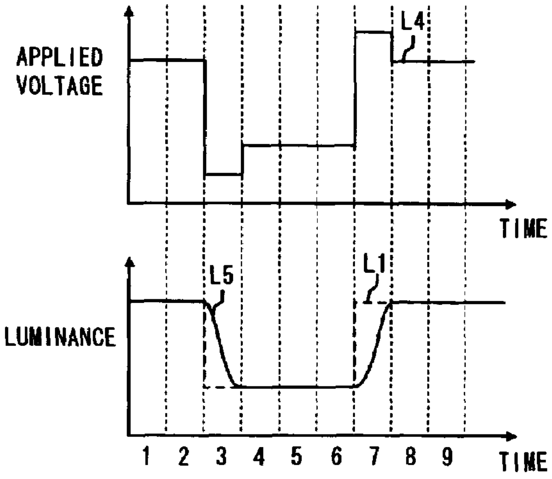

On the other hand, FIG. 3B shows the state where the overdrive processing has been performed. Just like in FIG. 3A, if the image data changes like L1, the overdrive processing unit 16 supplies corrected image data for enhancing a tone change in the image data to the data line driver 19, thereby changing the applied voltage to the liquid crystal panel 7 as indicated by L4. The display luminance L5 of the liquid crystal panel 7 when performing the overdrive processing reaches desired display luminance earlier than the display luminance L3 when not performing the overdrive processing. A response speed of liquid crystal is thus improved.

Referring back to FIG. 1, the data line driver 19 sequentially receives the corrected image data $Dd_n$ that is supplied from the overdrive processing unit 16 or the expanded image data $SD2_{n-1}$ that is supplied from the second expander 15 by bypassing the overdrive processing unit 16 and latches the image data of one line. Then, the data line driver 19 applies a voltage that is selected from a tone voltage Vg generated by a tone voltage generator 17 according to the image data to the liquid crystal panel 7 in accordance with a timing signal CLK1 from the timing controller 18. The gate line driver 6 applies a gate pulse to the liquid crystal panel 7 in accordance with a timing signal CLK2 from the timing controller 18.

In this configuration, the data line driver 19 drives the liquid crystal panel 7 to display a still image by latching the expanded image data $SD2_{n-1}$ that is output from the second expander 15, and it is thereby possible to display the image not through the overdrive processing unit 16.

Since a conventional configuration where the controller driver 8 merely has an overdrive processor needs an input to the overdrive processor for displaying a still image as well, it requires power for the input. It also requires power for access to the image memory. This is because the controller driver 8 always operates in the way of displaying a moving image due to its lack of using the moving/still image switching signal S1. Thus, the conventional configuration that merely adds an overdrive processor to the controller driver 8 fails to reduce power consumption. Further, in displaying a still image in such a configuration, the overdrive processor keeps performing overdrive computing by comparison with the image data that has been input last time due to lack of image data input to the overdrive processor. The overdrive processor selects and outputs corrected image data after comparing the image data that is displayed in the last place before turning to still image display with the image data that remains in the image memory, and it is thus unable to display the still image correctly.

On the other hand, since the controller driver 1 of this embodiment has a roundabout route R2 and selects an output destination of the second expander 15 according to the type of image, it is possible to display a still image by bypassing the overdrive processing unit 16. This configuration allows display of a still image without a need for the overdrive processing unit 16 to operate, thereby saving power consumption for displaying still images. Further, this configuration prevents the overdrive processing unit 16 from outputting erroneous corrected image data in displaying a still image, thus allowing correct still image display.

The compression processing performed by the first compressor 11 and the second compressor 12 is described herein. The compression process of image data in the first compressor 11 and the second compressor 12 may employ a systematic dither method. The systematic dither method creates pseudo-display image by spatially dispersing errors caused by image compression. This method artificially represents an intermediate tone corresponding to a tone that has been lost by image compression with use of a dither matrix that combines a plurality of adjacent pixels as one set. The systematic dither method is described in detail herein with reference to FIGS. 4A to 4C and 5.

Figure 4A:
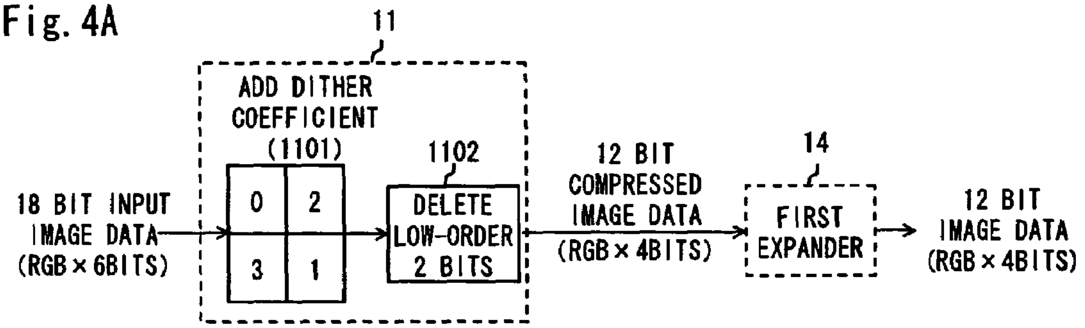
FIGS. 4A to 4C are views to describe an example of an image compressing method.

FIG. 4A shows a case of obtaining compressed image data of 12 bits (4 bits per each color of RGB) from input image data of 18 bits (6 bits per RGB) by using a dither matrix of 2×2 pixels. Upon input of image data of 18 bits to the first compressor 11, a processing of adding a dither coefficient (1101) and a processing of deleting low-order 2 bits from each subpixel of RGB added with the dither coefficient (1102) are performed, and image data of 12 bits (4 bits per RGB) is output. Though the 12-bit compressed image data that is output from the first compressor 11 is then transferred to the first expander 14, since the systematic dither method cannot perform expansion processing, the first expander 14 in this case merely serves as a through circuit or contains a line only.

Figure 5:
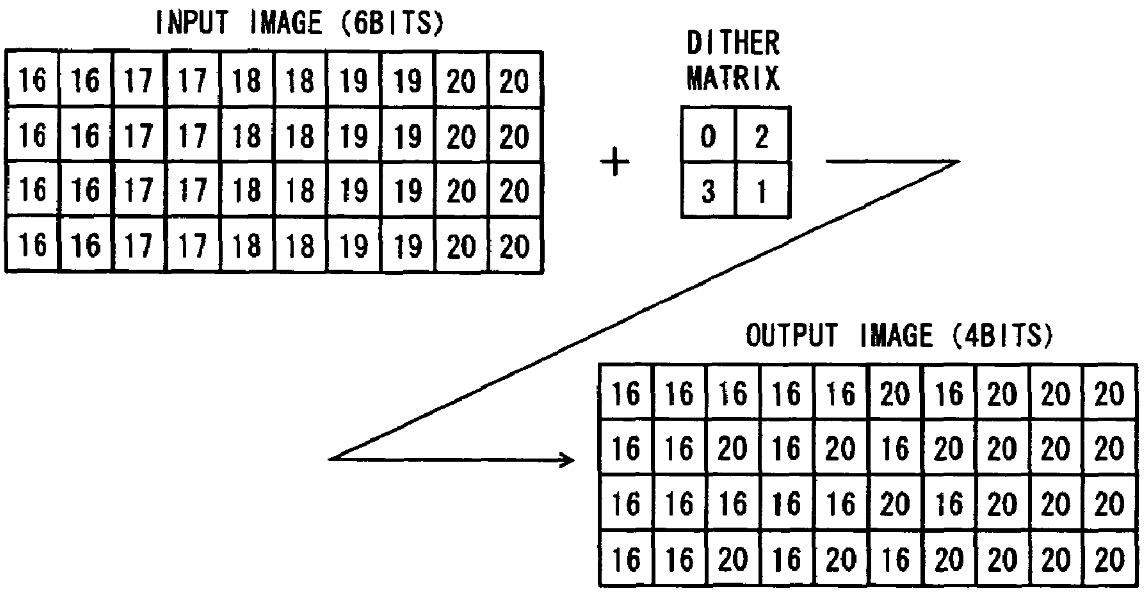
FIG. 5 is a view to describe an example of an image compressing method.

FIG. 5 shows an example of image compression by the systematic dither method. FIG. 5 shows input image of 10×4 pixels composed of image data with 6 bits per pixel and output image that is compressed to 4 bits per pixel with use of a 2×2 dither matrix shown therein. The values of the input image and the output image are the tone value of each pixel represented in decimal numbers. The processing of adding a dither coefficient to an input image in FIG. 5 adds dither coefficients 0, 2, 0, 2 . . . to an odd line of input image sequentially from a top pixel of the line and further adds dither coefficients 3, 1, 3, 1, . . . to an even line of input image sequentially from a top pixel of the line. As a result of the processing of deleting low-order 2 bits from the image data added with the dither coefficients, intermediate tones (17, 18, 19) are lost from the input image containing four tones from a tone 16 to a tone 20, and output image that is compressed to contain only the tone 16 and the tone 20 is acquired. Though the output image is compressed to 4 bits per pixel, it can express the tone equivalent to 6 bits because of visual integral effect, which is the characteristics of the systematic dither method.

As described above, fixed use of one dither matrix causes the errors spatially distributed by the dither processing to be enhanced by the overdrive processing, leading to a more granular image displayed on the liquid crystal panel. This is described more specifically with reference to FIGS. 6A to 6C. FIGS. 6A to 6C show overdrive processing where an image of 8 pixels displayed with 18 tone is changed to an image with 21 tone. FIG. 6A is an example of a look-up table 162 and it shows that changing from an image with 18 tone to an image with 21 tone requires overdrive at an applied voltage corresponding to an image of 24 tone.

FIG. 6B shows overdrive processing for an image on which dither processing is not performed. Since a present frame image is 18 tone and a changed frame image is 21 tone, a voltage corresponding to an image with 24 tone is applied to liquid crystal in a frame when changing (overdrive frame). In a frame after that (subsequent frame), a voltage of 21 tone is applied to liquid crystal, thereby improving a response speed as described earlier with reference to FIG. 3A to 3C.

FIG. 6C, on the other hand, shows overdrive processing for an image that has been 2-bit compressed with a 2×2 dither matrix as shown in FIG. 5. In the systematic dither method, the image before compression with 18 tone is represented as an image in which 16 tone and 20 tone pixels are mixed as shown in FIG. 6C. Further, the image with 21 tone is represented after change as an image in which 20 tone and 24 tone pixels are mixed. Compared with the frame before change (present frame), three kinds of pixels, a pixel changed from 16 tone to 20 tone, a pixel remained at 20 tone and a pixel changed from 20 tone to 24 tone, exist in the frame after change.

In implementation of the overdrive processing to such an image change according to the LUT 162 shown in FIG. 6A, overdrive is not performed on the pixel remaining at 20 tone while it is performed on the other pixels. This causes a difference in strength of overdrive among pixels. As a result, a difference of 10 tones occurs between the pixel of 20 tone and the pixel of 30 tone in the overdrive frame shown in FIG. 6C. An error of 4 tones due to the systematic dithering is thereby further enhanced to increase granularity of a display image.

Figure 4B:
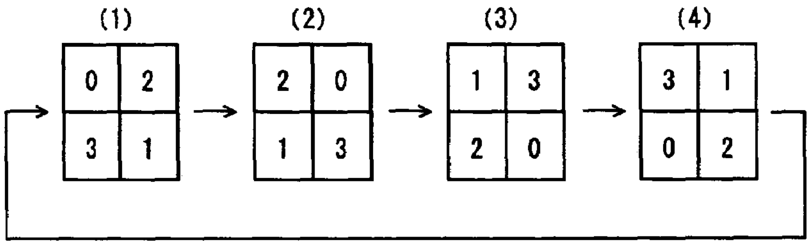
Figure 4C:
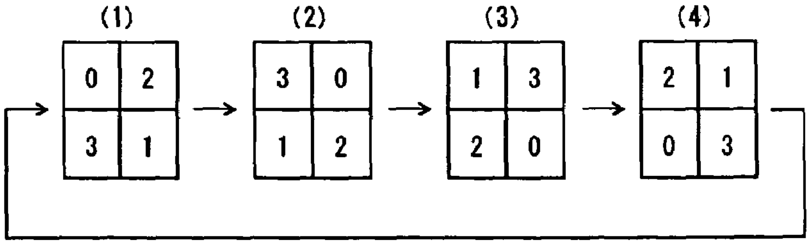

To overcome this drawback, the present invention performs overdrive processing for dispersing errors in terms of time to suppress granularity of a display image by changing a dither matrix to be used for image data with time. For example, compression processing to be applied to each frame is changed by changing the dither matrix with 4 frames in one cycle as shown in FIG. 4B. It is also feasible to rotate dither coefficients clockwise for each frame and change the dither matrix with 4 frames in one cycle.

In this case, if there is no change to an input image, an image after dither processing is output. If, on the other hand, there is a change to an input image, overdrive processing is performed on the image after dither processing. Therefore, as described above, the strength of overdrive can differ in some places in the display image and an error by the dither processing is enhanced, causing a more granular image. However, since the present invention disperses errors in terms of time by rotating the dither matrix each frame, it is possible to suppress granularity of an output image.

Further, when compressing image data by using a n×n dither matrix (n is an integer of 2 or greater), it is feasible to use $n^2$ number of different dither matrixes that are obtained by displacing dither coefficients and change the dither matrixes sequentially with $n^2$ frame in one cycle. For example, in the case of deleting low-order 4 bits of image data, use of a 4×4 dither matrix with dither coefficients of 0 to 15 to sequentially change 16 patterns of dither matrixes for each frame enables suitable overdrive processing that disperses errors in terms of time and suppresses granularity of a display image.

However, changing the compression processing on image data with time causes a compression error contained in compressed image data or expanded image data, which raises a new problem. In an example of a systematic dither method, if data is compressed by using a dither matrix where present image data and image data of immediately previous frame having the same tone are different, since compression errors contained in these images are different, comparison in the overdrive processing unit recognizes the two images as images having different tones, thus performing wrong overdrive processing.

In order to solve this new problem, the present invention determines the compression processing to be performed on the first compressor 11 and the second compressor 12 so that a compression error to be contained in compressed image data when compressing image data $D_n$ with the first compressor 11 and a compression error to be contained in compressed image data when compressing image data $D_{n-1}$ of immediately previous frame with the second compressor 12 are the same. For example, a systematic dither method may set the dither matrix to be used for image data $D_n$ in the first compressor 11 to be the same as the dither matrix used for image data $D_{n-1}$ of immediately previous frame in the second compressor 12. In other words, the dither matrix used in the second compressor 12 may be changed so as to be the same as the dither matrix used in the first compressor 11 when compressing image data of immediately subsequent frame.

Figure 7:
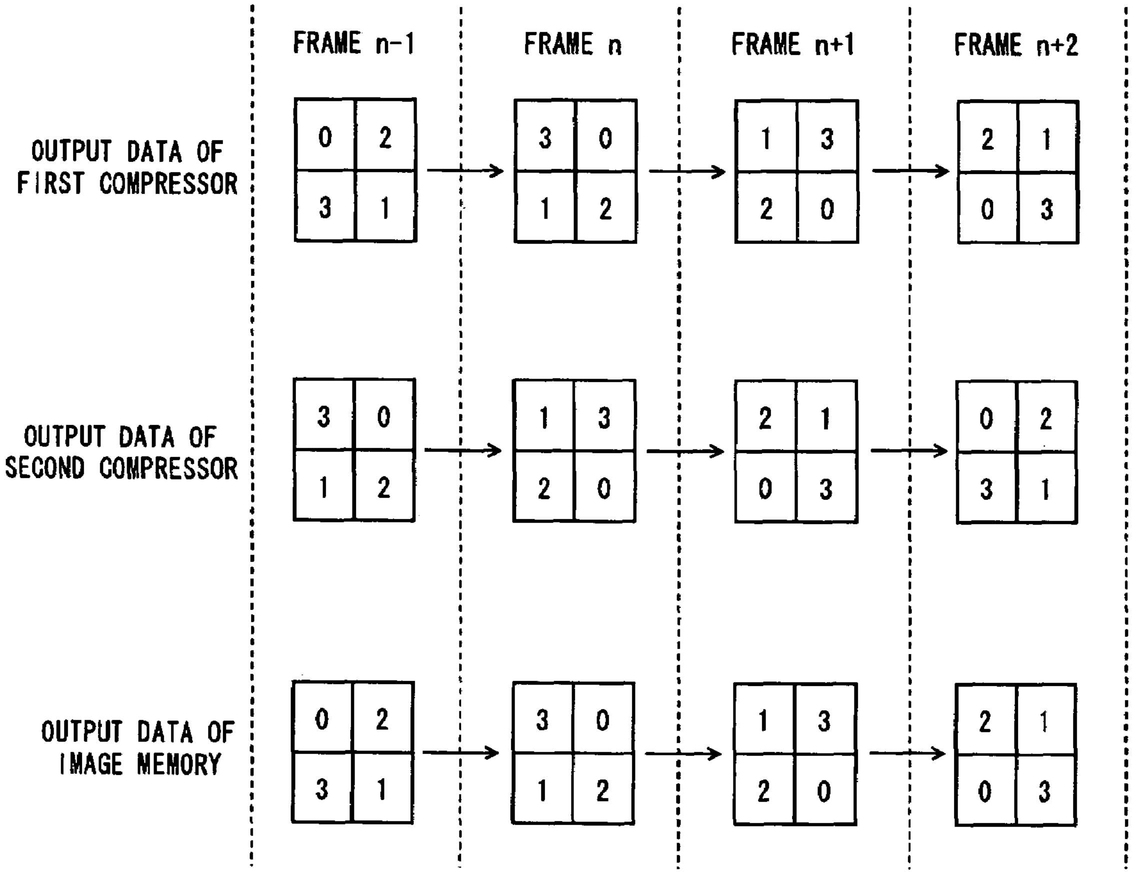
FIG. 7 is a view to describe relationship in compression error according to a first embodiment of the present invention.

This is described in further detail with reference to FIG. 7. FIG. 7 shows dither matrixes to be applied to output data of the first compressor 11, the second compressor 12, and the image memory 13. As shown therein, the dither matrix applied to the first compressor 11 for a frame n at a given time is the same as the dither matrix applied to the second compressor 12 for a frame n−1 of an immediately previous frame. In this way, the dither matrix applied to the first compressor 11 delays by one frame from the dither matrix applied to the second compressor 12. On the other hand, since the output data of the image memory 13 is image data compressed in the second compressor 12 in an immediately previous frame, the dither matrix applied to the first compressor 11 at a given time (e.g. frame n) and the dither matrix applied to the image data output from the image memory 13 at this time are the same. The overdrive processing unit 16 compares the output data of the first compressor 11 with the output data of the image memory 13. The dither matrixes used for the both, which are compression errors, are common.

This configuration allows equalizing a compression error contained in the image data $SD1_n$ and a compression error contained in compressed image data $SD2_{n-1}$ of immediately previous frame, which are compared in the overdrive processing unit 16.

As described above, the controller driver 1 of this embodiment changes the compression processing to be applied to the first compressor 11 and the second compressor 12 with time and equalizes compression errors contained in two image data compared in the overdrive processing unit 16. This configuration allows reducing granularity and block noise due to overdrive and compression errors while reducing a circuit size of the controller river. It is thereby possible to perform an appropriate overdrive processing without application of unnecessary voltage due to a difference in compression errors to the liquid crystal panel 7.

It is important for obtaining the above effects to equalize compression errors contained in the image data $SD1_n$ and the image data $SD2_{n-1}$ of immediately previous frame that are compared in the overdrive processing unit 16. Therefore, the configuration of the controller driver 1 that includes two compressors, the first compressor 11 and the second compressor 12, is merely an example. For example, it is feasible to compress one image data $D_n$ with different compression errors by time division processing in one compressor.

Further, the method for image compression used for the first compressor 11 and the second compressor 12 is not limited to the systematic dither method. Use of another irreversible compression method also enables appropriate overdrive processing by performing the same compression processing on the present image data in the first compressor 11 as the compression processing performed on the image data of immediately previous frame in the second processor 12. For example, it is feasible to perform compression and expansion processing for minimizing errors by expanding the data compressed by the dither processing disclosed in Japanese Unexamined Patent Publication No. 2003-162272 by way of reverse processing to the dither processing in compression.

Second Embodiment

Figure 8:
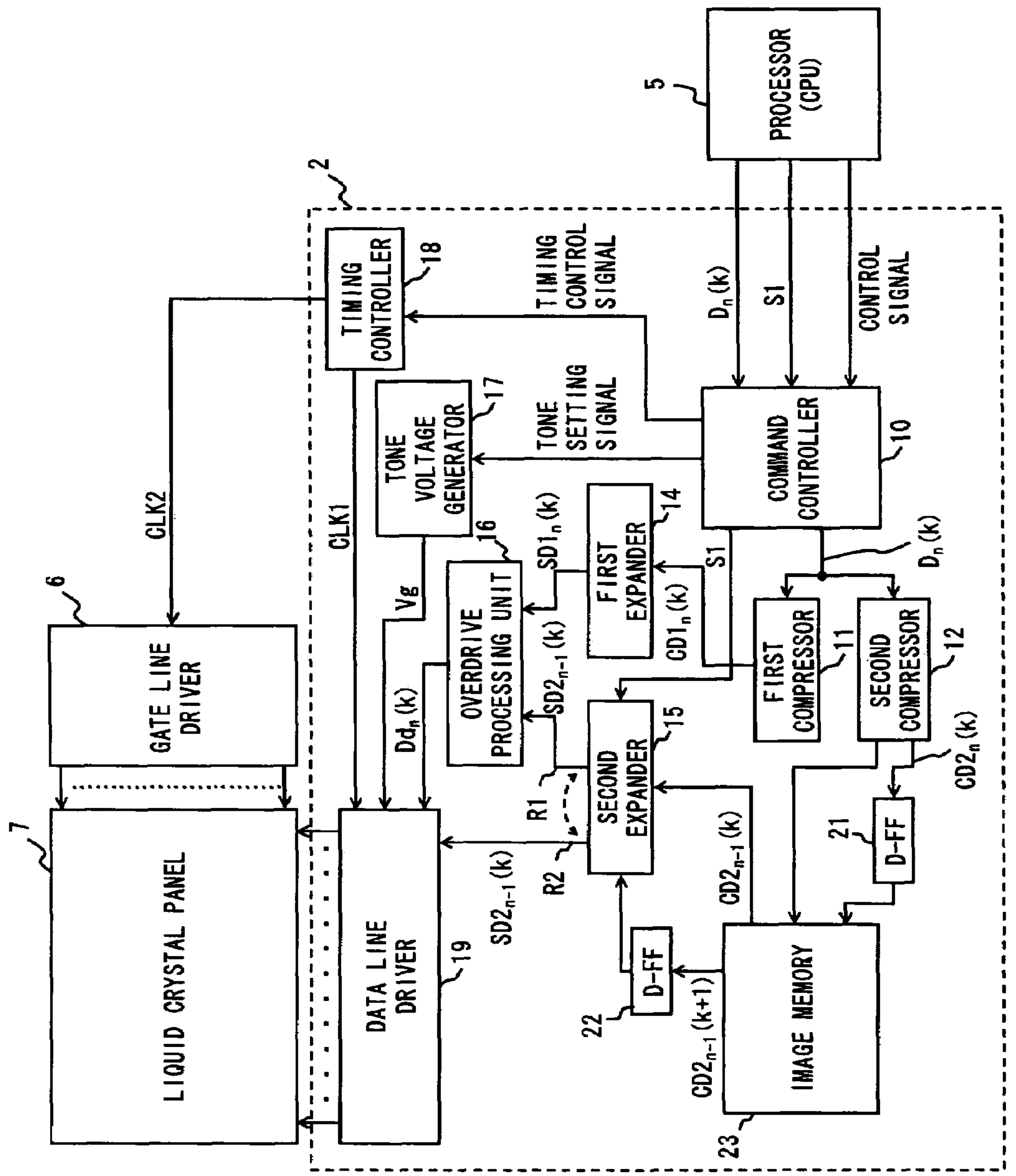
FIG. 8 is a block diagram of a controller driver according to an embodiment of the present invention.

FIG. 8 shows the configuration of a liquid crystal display apparatus that has a controller driver 2 according to a second embodiment of the invention. The controller driver 2 is different from the controller driver 1 in the first embodiment in having a D-type flip-flop (D-FF) 21 between the second compressor 12 and the image memory 23 and a D-FF 22 between the image memory 23 and the second expander 15. Since the other elements are the same as those in the controller driver 1, they are denoted by the same reference numerals and not detailed herein. The operation of the controller driver 2 having the D-FFs 21 and 22 is described hereinafter.

FIGS. 9A and 9B are views showing the flow of image data from the first compressor 11 and the second compressor 12 to the overdrive processing unit 16. FIGS. 9A and 9B show the processing on image data of successive two pixels. The input image data in FIG. 9A is represented by $D_n(k)$ and the input image data in FIG. 9B is represented by $D_n(k+1)$. The symbol n is a number assigned to a frame and the symbol k is a number assigned to a pixel.

In the first state shown in FIG. 9A, image data $D_n(k)$ is input to the first compressor 11 and the second compressor 12. The first compressor 11 compresses the image data $D_n(k)$ by the systematic dither method or the like and supplies compressed image data $CD1_n(k)$ to the first expander 14. On the other hand, the second compressor 12 outputs compressed image data $CD2_n(k)$ to the D-FF 21 and does not writes it into the image memory 23. The second expander 15 acquires the compressed image data $CD2_{n-1}(k)$ of a immediately previous frame from the image memory 23 and supplies expanded image data $SD2_{n-1}$ (k) to the overdrive computing circuit 16. At this time, compressed image data $CD2_{n-1}(k+1)$ at (K+1)th pixel that follows the data $CD2_{n-1}(k)$ is input to the D-FF 22 from the image memory 23 and the D-FF 22 holds it. In this way, the processing shown in FIG. 9A performs only reading from the image memory 23 and does not perform writing to the image memory 23.

In the second state shown in FIG. 9B, image data $D_n(k+1)$ is input. The first compressor 11 compresses the image data $D_n(k+1)$ and supplies compressed image data $CD1_n(k+1)$ to the first expander 14. The second compressor 12 reads compressed image data $CD2_n(k+1)$ to the image memory 23. At this time, $CD2_n(k)$ held by the D-FF 21 is also written to the image memory 23. On the other hand, the second expander 15 reads $CD2_{n-1}(k+1)$ held by the D-FF 22 and does not perform reading of image data from the image memory 23. In this way, the processing shown in FIG. 9B performs only writing to the image memory 23 and does not perform reading from the image memory 23.

Figure 10:
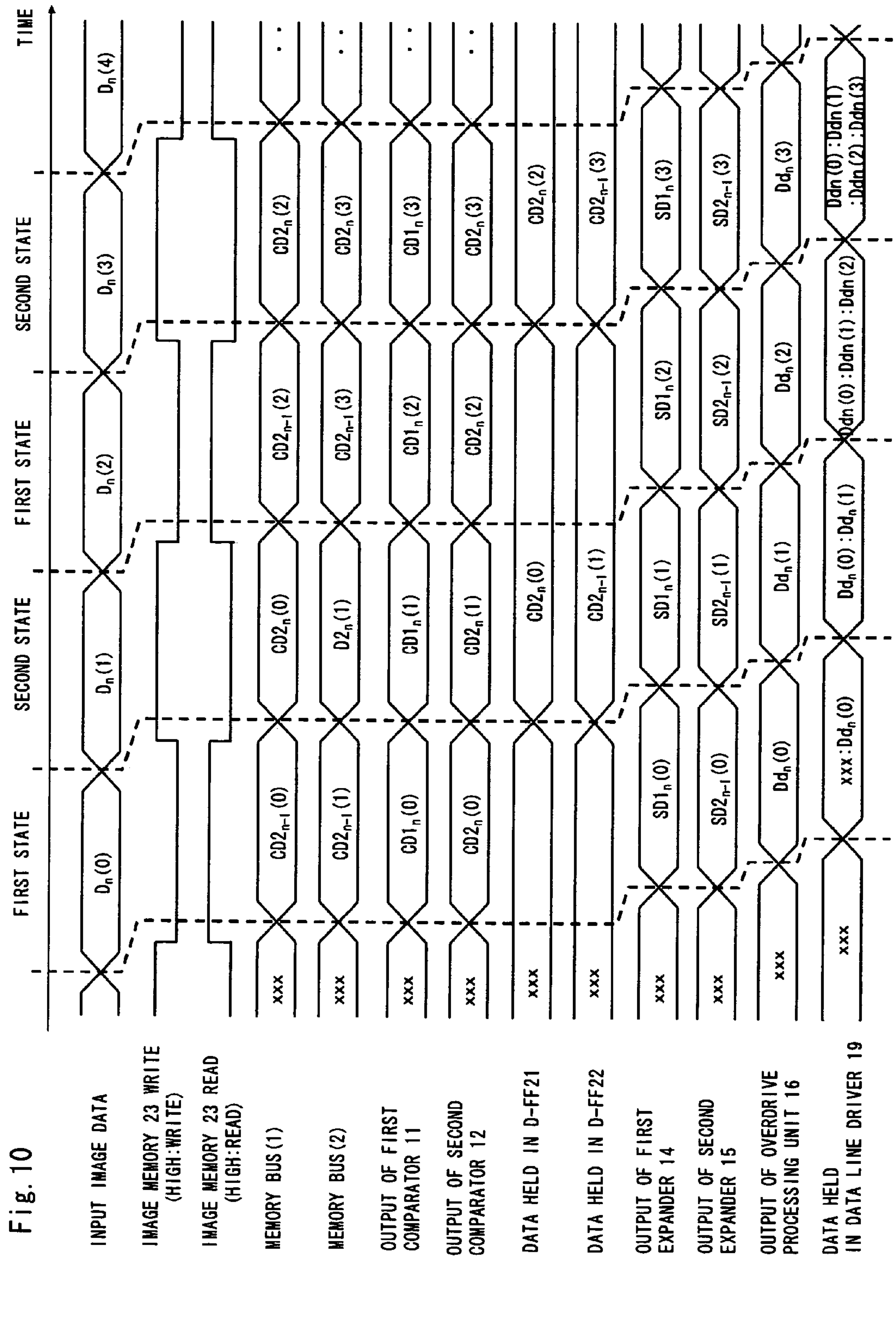
FIG. 10 is a timing chart of a controller driver according to an embodiment of the present invention.

FIG. 10 is a view showing input/output timing of image data to the controller driver 2. As shown therein, reading and writing operations on the image memory 23 are performed alternately in the first state and the second state. In FIG. 10, a memory bus (1) indicates data that is supplied from the image memory 23 to the second expander 15 in the first state and indicates data that is supplied from the D-FF 21 to the image memory 23 in the second state. A memory bus (2) indicates data that is supplied from the image memory 23 to the D-FF 22 in the first state and indicates data that is supplied from the second compressor 12 to the image memory 23 in the second state.

As described above, the controller driver 2 performs writing or reading on the image memory 23 in units of 2 pixels. The controller driver 1 of the first embodiment needs to perform writing of $CD2_n$ and reading of $CD2_{n-1}$ on the image memory 13 in the controller driver 1 during outputting image data of one pixel. It is thereby necessary to performs access to the image memory 13 with a clock frequency doubled from an image display clock frequency or form the image memory 13 as a dual port memory. On the other hand, the controller driver 2 of this embodiment performs either writing or reading on the image memory during outputting image data of one pixel. This eliminates the need for a clock frequency doubled from an image display clock frequency, and the image memory 3 can be formed as a single port memory.

Though this embodiment includes the D-FFs 21 and 22, it is not limited thereto as long as a circuit can hold compressed image data temporarily during outputting image data of one pixel. It is thus feasible to use a temporary data holding circuit such as a latch circuit instead of the D-FFs 21 and 22.

If the controller driver 2 of this embodiment is configured to have a roundabout route R2 so as to select an output destination of the second expander 15 according to a moving/still image switching signal S1 output from the command controller 10 just like the controller driver 1 of the first embodiment, it is possible to display a still image by bypassing the overdrive computing circuit 16. This configuration allows display of a still image without a need for the overdrive processing unit 16 to operate, thereby reducing power consumption in displaying the still image. Further, this configuration prevents the overdrive processing unit 16 from outputting erroneous corrected image data in displaying a still image, thus displaying the still image correctly.

Third Embodiment

Figure 11:
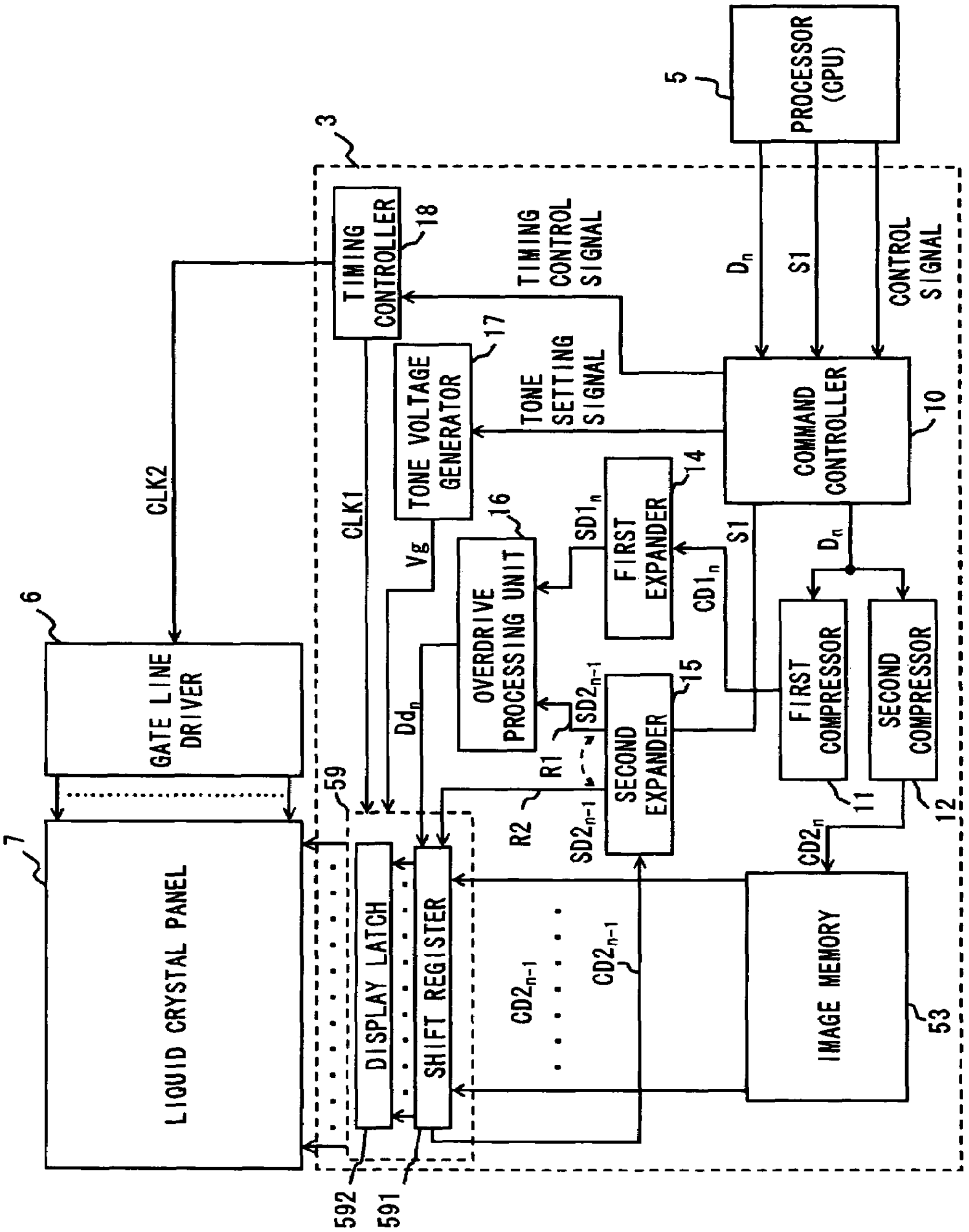
FIG. 11 is a block diagram of a controller driver according to an embodiment of the present invention.

FIG. 11 shows the configuration of a liquid crystal display apparatus that has a controller driver 3 according to a third embodiment of the invention. The controller driver 3 is different from the controller driver 1 of the first embodiment in transferring compressed image data of one line in block from the image memory 53 to a shift register 591 included in the data line driver 59 and then inputting the compressed image data from the shift register 591 to the second expander 15 to perform expansion processing thereon. The expansion processing through the shift register 591 is described hereinafter.

Firstly, compressed image data of one line is transferred in block from the image memory 53 to the shift register 591 in the data line driver 59. Then, the compressed data stored in the shift register 591 is transferred to the second expander 15 where expansion processing is performed.

Figure 12A:
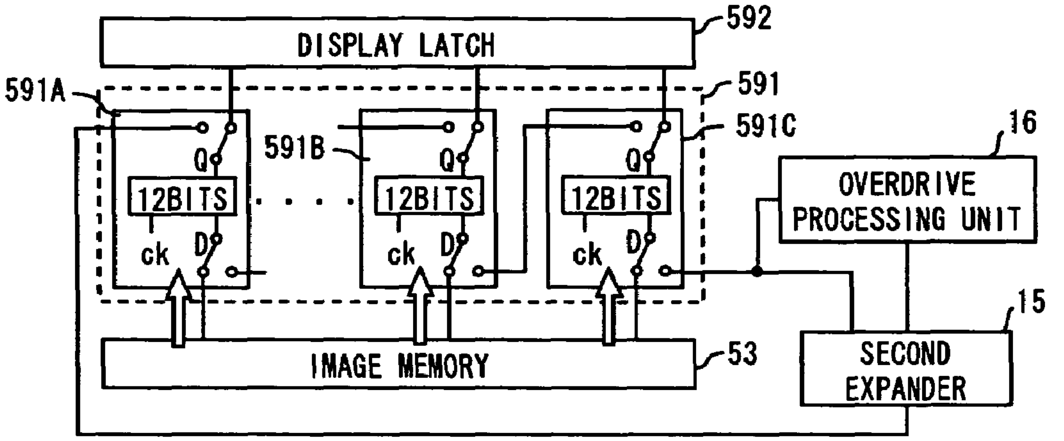
FIGS. 12A to 12C are views to describe the operation of a controller driver according to an embodiment of the present invention.
Figure 12B:
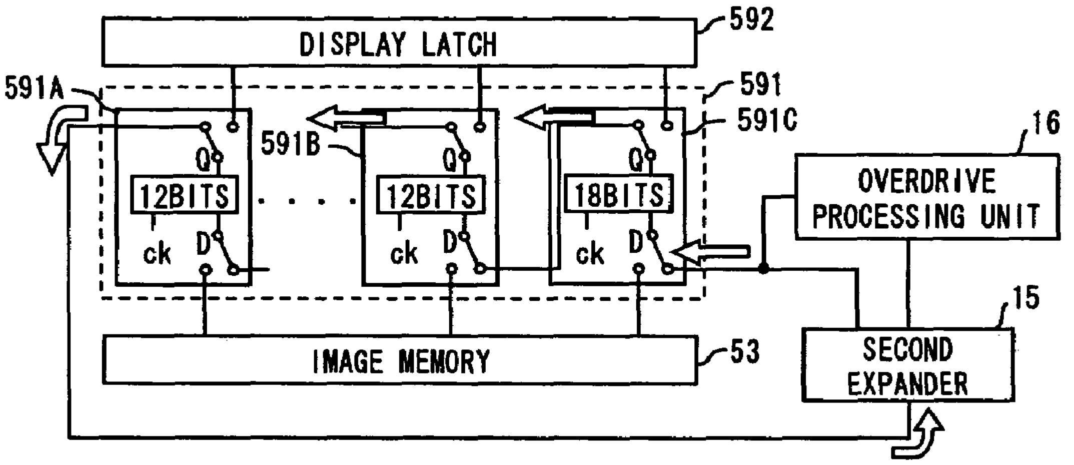
Figure 12C:
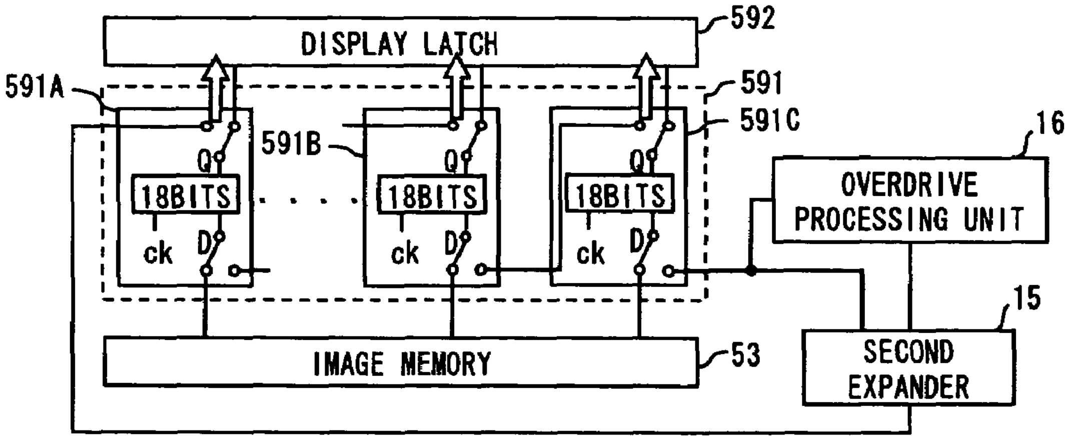

The data transfer operation between the shift register 591 and the second expander 15 is described herein with reference to FIGS. 12A to 12C. FIGS. 12A to 12C show a case where compressed image data is 12 bits and expanded image data is 18 bits as an example. Firstly, compressed image data of one line is transferred in block from the image memory 53 to the shift register 591 as shown in FIG. 12A. The image memory is a memory that can store compressed image data of at least one frame.

Then, the compressed data is transferred to the second expander 15 sequentially from the data held by a flip-flop (FF) 591A by shift operation. At the same time, FFs 591B and 591C shifts the image data sequentially to the left in the figure. Further, 18-bit corrected image data output from the overdrive computing circuit 15 or 18-bit expanded image data output from the second expander 15 are held by the FF 591C. By repeating the shift operation for image data of one line, the shift register 591 is rewritten with display image data.

Finally, the image data is transferred to a display latch 592, thereby driving the liquid crystal panel 7 as shown in FIG. 12C. In accordance with the latch operation to transfer the image data to the display latch 592, compressed image data of the next one line is transferred in block from the image memory 53 to the shift register 591, and the above process is repeated after that.

In this way, since the controller driver 3 performs expansion processing after transferring compressed image data of one line in block to the shift register 591, it is possible to suppress an access to the image memory 53 to one time for image data of one line. This reduces the number of memory accesses compared with the controller driver 1 of the first embodiment that performs memory access for each pixel, thereby lowering power consumption required for memory access.

If the controller driver 3 of this embodiment is configured to have a roundabout route R2 so as to select an output destination of the second expander 15 according to a moving/still image switching signal S1 output from the command controller 10 just like the controller driver 1 of the first embodiment, it is possible to display a still image by bypassing the overdrive computing circuit 16. This configuration allows display of a still image without a need for the overdrive processing unit 16 to operate, thereby reducing power consumption in displaying the still image. Further, this configuration prevents the overdrive processing unit 16 from outputting erroneous corrected image data in displaying a still image, thus displaying the still image correctly.

Fourth Embodiment

Figure 13:
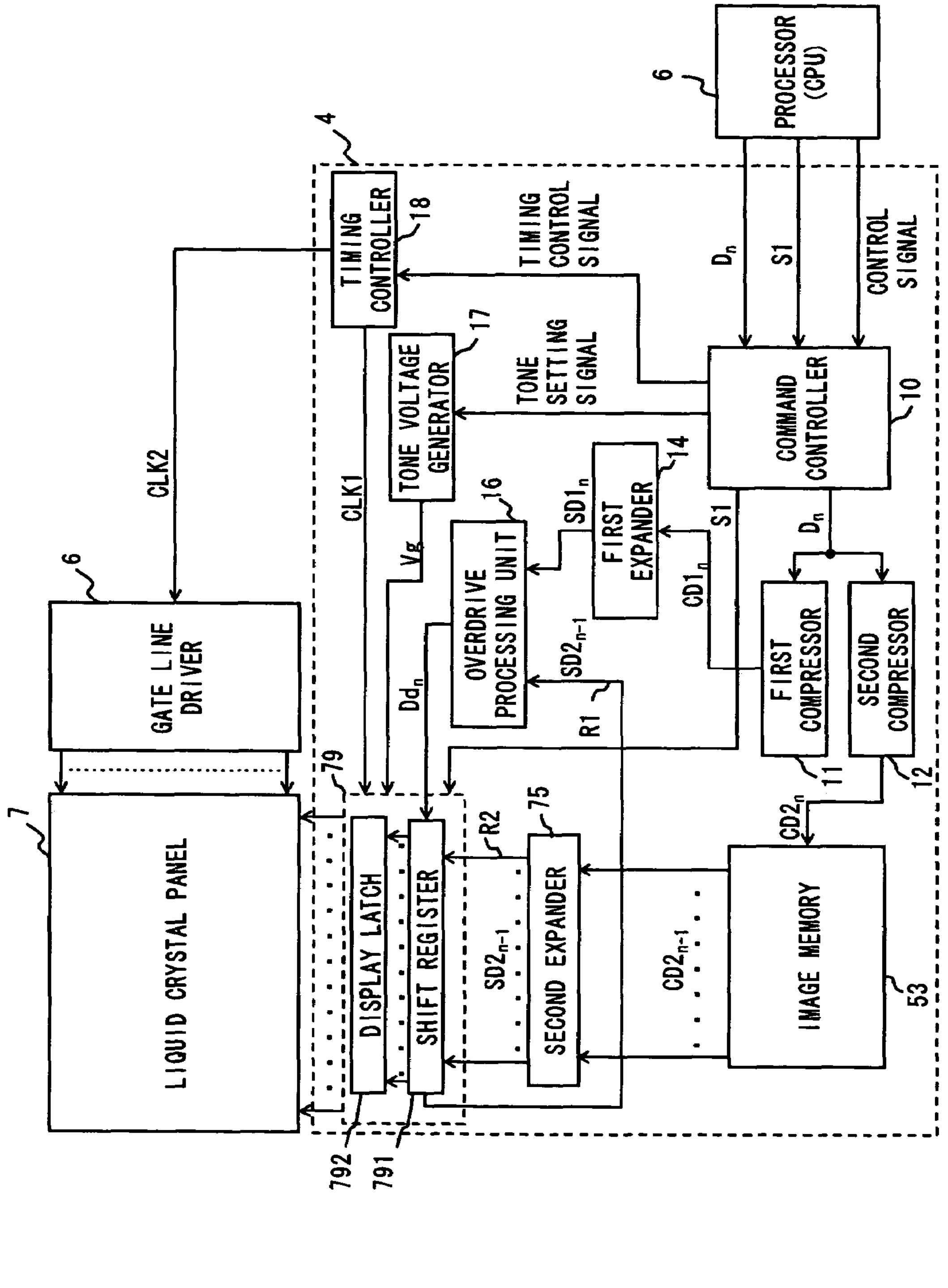
FIG. 13 is a block diagram of a controller driver according to an embodiment of the present invention.

FIG. 13 shows the configuration of a liquid crystal display apparatus that has a controller driver 4 according to a fourth embodiment of the invention. The controller driver 4 first transfers compressed image data of one line in block from the image memory 53 to a second expander 75. The second expander 75 is capable of performing expansion processing on compressed image data of one line in parallel. The second expander 75 may be configured by arranging the same number of conventional second expanders 15 as the number of pixels in one line in parallel. Image data $SD2_{n-1}$ expanded in the second expander 75 is transferred to the shift register 791 in the data line driver 79.

In the case of performing the overdrive processing, expanded image data $SD2_{n-1}$ is sequentially supplied to the overdrive processing unit 16 by the shift operation of the shift register 791 so that the overdrive processing unit 16 compares it with present expanded image data $SD1_n$. The corrected image data $Dd_n$ output from the overdrive processing unit 16 is stored in the shift register 791. Thus, every time the shift register 791 supplies the image data $SD2_{n-1}$ of immediately previous frame to the overdrive processing unit 16, the overdrive processing unit 16 supplies the corrected image data $Dd_n$ to the shift register 791. By repeating this operation for one line, the shift register 791 is rewritten with display image data. After acquiring display image data for one line, the image data is transferred to the display latch 792 to drive the liquid crystal panel 7.

On the other hand, in the case of not performing the overdrive processing such as when displaying a still image, expanded image data $SD2_{n-1}$ is transferred from the second expander 75 to the shift register 791. Then, the image data $SD2_{n-1}$ is transferred from the shift register 791 to the display latch 592 to drive the liquid crystal panel 7. The switching of the output destination of the shift register 791 between moving image display and still image display may be performed by inputting a moving/still image switching signal S1 output from the command controller 10 to the data line driver 79 and not connecting the shift register 791 to the overdrive processing unit 16 when displaying a still image.

In this configuration, the controller driver 4 allows reduction of power consumption by suppressing the number of times of memory access just like the controller driver 3 of the third embodiment. Further, since it eliminates the need for shift operation of the shift register 791 when displaying a still image, it allows further reduction of power consumption in still image display compared to the controller driver 3. Furthermore, the controller driver 4 allows display of a still image without a need for the overdrive processing unit 16 to operate, thereby reducing power consumption in displaying the still image. Further, this configuration prevents the overdrive processing unit 16 from outputting erroneous corrected image data in displaying a still image, thus displaying the still image correctly.

Although the controller drivers 1 to 4 do not include the gate line driver 6 in the first to fourth embodiments described above, this configuration is merely an example. The controller drivers 1 to 4 may include the gate line driver 6 or may further include a power supply circuit or the like, which can also achieve the functions and effects of the present invention.

It is apparent that the present invention is not limited to the above embodiment that may be modified and changed without departing from the scope and spirit of the invention.

What is claimed is:

1. A controller driver comprising:

a compressing unit compressing received image data to generate first compressed image data and second compressed image data;

an image memory capable of storing the second compressed image data of at least one frame; and an overdrive processing unit receiving the first compressed image data or expanded data thereof and also receiving the second compressed image data of one frame previous to the first compressed image data or expanded data thereof, and generating corrected image data where a tone value of the received image data is corrected based on the data, wherein the compressing unit changes compression processing performed in generating the first compressed image data and the second compressed image data with time, and compression processing performed in generating the first compressed image data in the compressing unit is the same as compression processing performed in compressing image data of one frame previous to the received image data to generate the second compressed image data.

2. The controller driver according to claim 1, wherein the compressing unit comprises:

a first compressor compressing the received image data to generate the first compressed image data and a second compressor compressing the received image data to generate the second compressed image data, wherein the first compressor and the second compressor change compression processing performed in generating the first compressed image data and the second compressed image data, respectively, with time, and compression processing performed in the first compressor is the same as compression processing performed in the second compressor in compressing image data of one frame previous to the received image data.

3. The controller driver according to claim 2, wherein the first compressor and the second compressor compress image data by dithering, and a dither matrix applied to the first compressor in compressing the received image data is the same as a dither matrix applied to the second compressor in compressing image data of one frame previous to the received image data.

4. The controller driver according to claim 3, wherein the dither matrix applied to the second compressor is changed frame by frame.

5. The controller driver according to claim 4, wherein the dither matrix applied to the second compressor is a dither matrix of n×n (n is an integer of 2 or greater), and the dither matrix applied to the second compressor is changed frame by frame among $n^2$ number of different dither matrixes obtained by displacing a dither coefficient of the n×n dither matrix.

6. The controller driver according to claim 2, comprising:

an expander expanding the second compressed image data acquired from the image memory;

a first temporary data holding circuit capable of holding the second compressed image data output from the second compressor and accessible from the image memory; and a second temporary data holding circuit capable of holding the second compressed image data output from the image memory and accessible from the expander.

7. The controller driver according to claim 2, comprising:

an expander capable of expanding the second compressed image data; and a shift register storing the corrected image data, wherein the shift register is connected to the image memory so as to acquire the second compressed image data of one line at a time from the image memory, and the shift register is also connected to the expander so as to supply held data to the expander by shift operation.

8. The controller driver according to claim 2, comprising:

an expander capable of expanding the second compressed image data in a unit of line; and a shift register storing the corrected image data, wherein the shift register is connected to the expander so as to acquire image data of one line expanded from the second compressed image data at a time from the expander, and the shift register is also connected to the overdrive processing unit so as to supply held data to the overdrive processing unit by shift operation.

9. A liquid crystal display apparatus including a controller driver and a liquid crystal display section driven by the controller driver, wherein the controller driver comprises:

a compressing unit compressing received image data to generate first compressed image data and second compressed image data;

an image memory capable of storing the second compressed image data of at least one frame; and an overdrive processing unit receiving the first compressed image data or expanded data and also receiving second compressed image data of one frame previous to the first compressed image data or expanded data and generating corrected image data where a tone value of the received image data is corrected based on the data, wherein the compressing unit changes compression processes performed in generating the first compressed image data and the second compressed image data with time, and compression processing performed in generating the first compressed image data in the compressing unit is the same as compression processing performed in compressing image data of one frame previous to the received image data to generate the second compressed image data.

10. A liquid crystal driving method comprising:

receiving image data;

compressing the received image data to generate first compressed image data;

generating corrected image data where a tone value of the received image data is corrected based on the first compressed image data or expanded data thereof and second compressed image data of one frame previous to the first compressed image data or expanded data thereof, wherein compression processing performed in generating the first compressed image data and the second compressed image data is changed with time, and compression processing performed in generating the first compressed image data is the same as compression processing performed in compressing image data of one frame previous to the received image data to generate the second compressed image data.

11. The liquid crystal driving method according to claim 10, wherein the first compressed image data and the second compressed image data are generated by dithering, and a dither matrix applied in compressing the received image data to generate the first compressed image data is the same as a dither matrix applied in compressing image data of one frame previous to the received image data to generate the second compressed image data.

12. The liquid crystal driving method according to claim 11, wherein the dither matrix applied in generating the second compressed image data is changed with a dither matrix applied in generating compressed image data one frame previously.

13. The liquid crystal driving method according to claim 12, wherein the dither matrix applied in generating the second compressed image data is a dither matrix of n×n (n is an integer of 2 or greater), and the dither matrix applied in generating the second compressed image data is changed frame by frame among $n^2$ number of different dither matrixes obtained by displacing a dither coefficient.

* * * * *